UNITED STATES PATENT OFFICE.

CHARLES PATTON DIMITRY, OF NEW ORLEANS, LOUISIANA.

INDELIBLE INK.

SPECIFICATION forming part of Letters Patent No. 370,383, dated September 27, 1887.

Application filed February 2, 1886. Serial No. 190,577. (Specimens.)

*To all whom it may concern:*

Be it known that I, CHARLES PATTON DIMITRY, a citizen of the United States, residing at New Orleans, in the parish of Orleans and State of Louisiana, have invented a new and useful composition of matter to be used for writing purposes with a pen as any fluid ink is used, of which the following is a specification.

My composition consists of a union of various ingredients held in solution in water, thoroughly blended by agitation, and afterward to be exposed to sunlight, in order that the solution may be perfected for its intended purpose, composed, in proper proportions, of gelatine or animal glue, bichromate of potash, a coloring-matter, (an aniline dye-powder, the kind known in commerce as "Diamond" dyes preferred,) animal, vegetable, or otherwise, and an antiseptic, creosote, the whole producing a composition of matter to remain in a permanent condition of fluidity, not liable to putrefaction, and which will be a fluid furnishing an acid-resisting and water-resisting mark, impression, or stain.

In order to produce a quantity of this fluid composition of a black color equal to a pint-measure, the above-mentioned ingredients, combined approximately in the proportions given below, may be used, viz: pure water, one pint; best gelatine, one-fourth of an ounce; bichromate of potash, sixty grains; Diamond slate dye, one-third of an ounce; creosote, eight drops; india-ink, (crushed,) a piece about as large as a grain of corn.

To produce a pint of fluid of another color than black, the ingredients named in the foregoing formula, with the exception of the Diamond slate dye and the india-ink, should be used, the Diamond slate dye and the india-ink being replaced with a coloring-matter—animal, vegetable, or otherwise—of the color desired, in such proportion as experiment may show to be proper and best.

In preparing this composition for its designed use I base my invention and its utility on the known fact that gelatine or animal glue in a water solution with bichromate of potash becomes insoluble after exposure to the sunlight. The coloring-matter is added to the solution of these two ingredients to render the mixture adaptable to practical use, as intended in my invention, by furnishing a fluid which will afford an indelible writing material, and the creosote is added to the solution of the three named ingredients in order to counteract the tendency of the gelatine in a continued state of solution to putrefy. By blending all these ingredients in a state of solution in water I produce a composition which will remain in a fluid condition, and not putrefy, for an indefinite period, and so subserve the purposes for which I have invented it.

In manufacturing the composition according to the formula given above, the bichromate of potash should first be dissolved in a pint of water. Then the gelatine, having been put to soak in cold water and allowed to absorb as much water as it will contain, and afterward dissolved by a gentle heat into a thin fluid, should be poured, in a darkened room, into the vessel containing the bichromate-of-potash solution while the solution is in a heated condition, and the vessel containing the mixture should be well shaken, so that a thorough blending of the two solutions may take place. To this mixture the coloring-matter should be added immediately, and the vessel should again be well shaken. Next add the creosote and shake the vessel again. The vessel containing the entire solution should then be exposed to the light (sunlight is preferable, with the sun shining directly on the vessel) for an hour or two, in order that the action thereof may fix the whole into an indelible state, and so adapt the mixture to the purposes of my invention. When the vessel has been exposed to the sunlight for the time stated, it should be brought indoors and allowed to stand for a few days, and then strained through a cloth into another vessel. The solution will then be ready for use.

I claim this composition of pure water, gelatine or animal glue, bichromate of potash, a coloring-matter, and an antiseptic, combined in a permanent solution, as an original invention of mine, for the reason that I am not aware that all of the ingredients of my composition, in the proportions stated or otherwise, and having for a resultant a permanent solution adaptable to the purposes designed, have been used together heretofore, or have been suggested in any way, in a publication or otherwise, for use for the purposes named in this specification or for any other purpose.

I am aware that gelatine or animal glue is frequently combined in solution with bichromate of potash for use in the arts, and that it is also used in the composition of india-ink; but it never has come to my knowledge that it has formed a part of a solution composed, in addition to itself, of the ingredients, to wit: bichromate of potash, a coloring-matter, an antiseptic, described in the formula hereinbefore given, and which solution, as a whole, constitutes my invention.

Having fully described my invention, what I desire especially to claim and secure by Letters Patent in connection with my invented composition is—

An indelible ink approximately in the proportions heretofore set forth and described, composed of pure water, gelatine, bichromate of potash, Diamond slate dye, creosote, and india-ink, the whole to be well shaken together and exposed to the sunlight, substantially as, in the manner, and for the purposes hereinbefore set forth and described.

New Orleans, Louisiana, January 30, 1886.

CHARLES PATTON DIMITRY.

Witnesses:
MARK F. BIGNEY,
LEONARD FASH.